United States Patent
Kakumoto et al.

(10) Patent No.: US 7,236,192 B2
(45) Date of Patent: Jun. 26, 2007

(54) IMAGE-SENSING DEVICE

(75) Inventors: Tomokazu Kakumoto, Nagaokakyo (JP); Yoshio Hagihara, Amagasaki (JP)

(73) Assignee: Minolta Co., Ltd., Osaka (JP)

(*) Notice: Subject to any disclaimer, the term of this patent is extended or adjusted under 35 U.S.C. 154(b) by 920 days.

(21) Appl. No.: 09/773,106

(22) Filed: Jan. 31, 2001

(65) Prior Publication Data

US 2001/0010548 A1    Aug. 2, 2001

(30) Foreign Application Priority Data

Feb. 2, 2000    (JP)    ............................. 2000-030197

(51) Int. Cl.
*H04N 5/235*    (2006.01)
*H04N 3/14*    (2006.01)

(52) U.S. Cl. .................. 348/229.1; 348/308; 348/302; 250/214 AG

(58) Field of Classification Search ............... 348/308, 348/301, 300, 302, 241, 312, 364, 229.1; 382/312; 250/332, 330, 208.1, 214 R, 214 A, 250/214 AG, 214 L, 214 C, 214.1, 206; 257/219
See application file for complete search history.

(56) References Cited

U.S. PATENT DOCUMENTS

| | | | |
|---|---|---|---|
| 3,953,733 A | | 4/1976 | Levine ....................... 250/330 |
| 4,973,833 A | | 11/1990 | Takada et al. |
| 5,241,575 A | | 8/1993 | Miyatake et al. |
| 5,576,761 A | * | 11/1996 | Iwamoto ..................... 348/257 |
| 5,933,190 A | * | 8/1999 | Dierickx et al. ............ 348/302 |
| 6,101,294 A | * | 8/2000 | McCaffrey et al. ......... 382/312 |
| 6,130,423 A | * | 10/2000 | Brehmer et al. ......... 250/208.1 |
| 6,469,740 B1 | * | 10/2002 | Kuroda et al. .............. 348/308 |
| 6,507,519 B1 | * | 1/2003 | Collins et al. ......... 365/185.28 |
| 6,532,040 B1 | * | 3/2003 | Kozlowski et al. ......... 348/241 |

FOREIGN PATENT DOCUMENTS

JP    03-192764 A    8/1991

* cited by examiner

*Primary Examiner*—Lin Ye
(74) *Attorney, Agent, or Firm*—Sidley Austin LLP

(57) ABSTRACT

Based on the output signal of an area sensor 1, a level adjustment circuit 2 adjusts the bias voltage fed to the transistors provided within the individual pixels of the area sensor 1 and operating in a subthreshold region and thereby adjusts the level of the output signal of the area sensor 1. According to whether the subject is illuminated with intense or dim light, the level of the output signal is lowered or raised, respectively.

15 Claims, 6 Drawing Sheets

IMAGE-SENSING DEVICE

This application is based on Japanese Patent Application No. 2000-030197 filed on Feb. 2, 2000, the contents of which are hereby incorporated by reference.

BACKGROUND OF THE INVENTION

1. Field of the Invention

The present invention relates to an image-sensing device having a photoelectric conversion means that outputs a signal logarithmically proportional to the amount of incident light.

2. Description of the Prior Art

A conventional area sensor having photosensitive devices such as photodiodes outputs a signal that is linearly proportional to the brightness of the light incident on the photosensitive devices. When a subject is shot with such a linear-conversion-based area sensor (hereinafter referred to as a "linear sensor"), no brightness data is obtained outside the roughly two-digit brightness range within which the linear sensor can effectively perform image sensing (this brightness range will hereinafter be referred to as the "shootable brightness range"). Here, this brightness range is represented as Lmax/Lmin, assuming that the brightness of the subject distributes from a minimum value Lmin [cd/m$^2$] to a maximum value Lmax [cd/m$^2$], and the range of the output of the linear sensor that corresponds to the range of the shootable brightness range is called the "dynamic range".

Accordingly, when the signal from this linear sensor is reproduced as an image on a display or the like, the displayed image suffers from flat blackness in low-brightness portions thereof and saturation (flat whiteness) in high-brightness portions thereof outside the shootable brightness range. It is possible to alleviate such flat blackness or saturation by shifting the shootable brightness range. However, this requires varying the aperture value or shutter speed of a camera, or the integral time for which to allow light in, and thus spoils ease of use.

On the other hand, the applicant of the present invention once proposed an area sensor (hereinafter referred to as a "LOG sensor") provided with a light-sensing means that outputs a photocurrent proportional to the amount of incident light, a MOS transistor to which the photocurrent is fed, and a bias means for biasing the MOS transistor in such a way that a subthreshold current flows therethrough, so that the photocurrent is converted logarithmically (refer to U.S. Pat. No. 4,973,833). This LOG sensor outputs a signal whose level is natural-logarithmically proportional to the brightness of incident light, and thus offers a wide shootable brightness range that corresponds to a five- to six-digit brightness range. This permits, even when the brightness distribution of a given subject tends to shift, the brightness distribution of the subject to lie most probably within the shootable brightness range.

However, a typical subject has a two- to three-digit brightness range, and therefore, if it is shot with a LOG sensor that offers a five- to six-digit dynamic range, the shootable brightness range is too wide relative to the actual brightness distribution of the subject, and this tends to spoil the sharpness of the obtained image.

SUMMARY OF THE INVENTION

An object of the present invention is to provide an image-sensing device that outputs a signal natural-logarithmically proportional to the amount of incident light wherein the level of the output signal is optimized to offer sharper images.

To achieve the above object, according to the present invention, an image-sensing device is provided with: a plurality of pixels that generate an electric signal proportional to the amount of incident light and then output the electric signal as an analog signal that is natural-logarithmically proportional to the amount of incident light; and a level adjuster that adjusts the level of the electric signal output from the pixels by adjusting according to the electric signal output from the pixels the bias voltage fed to the pixels.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
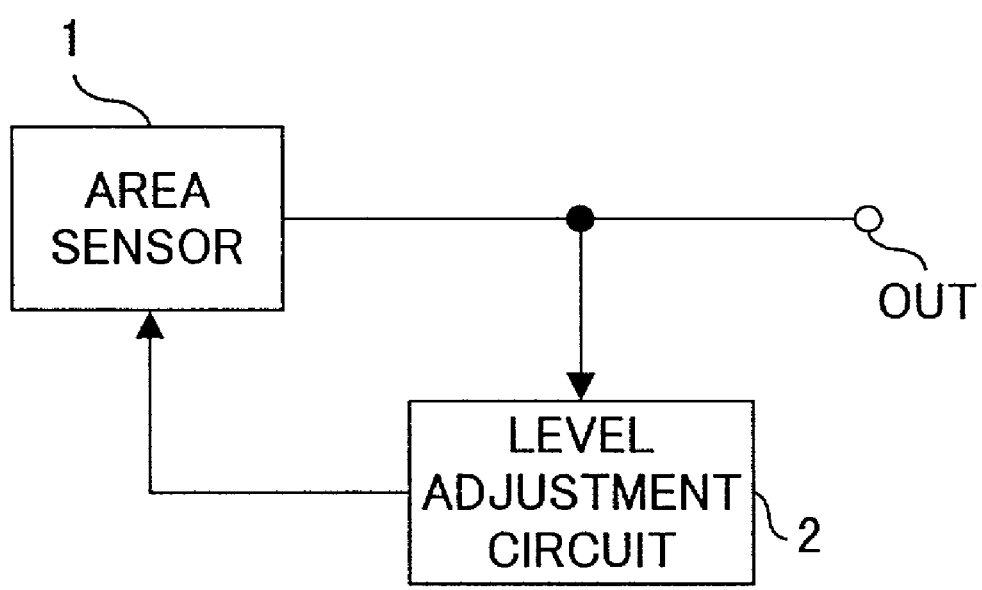
FIG. 1 is a block diagram showing the internal configuration of an image-sensing device embodying the invention.
Figure 2:
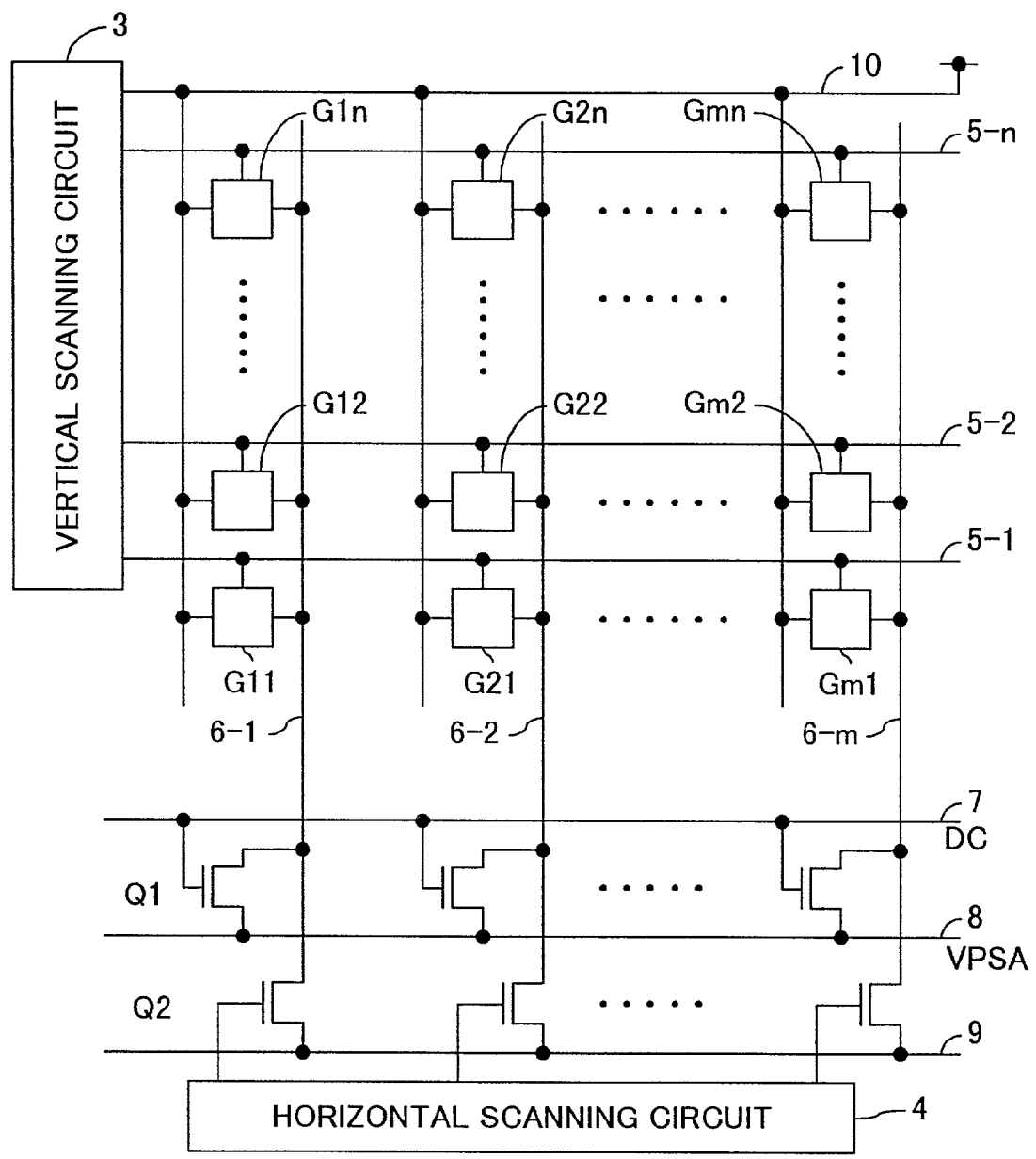
FIG. 2 is a block circuit diagram illustrating the overall configuration of the area sensor provided in the image-sensing device of FIG. 1.
Figure 4:
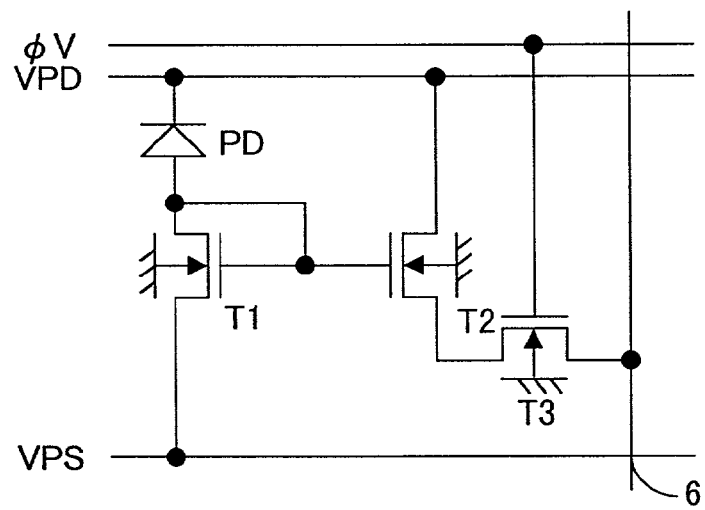
FIG. 4 is a circuit diagram showing the configuration of one pixel provided in the area sensor of FIG. 2.
Figure 5:
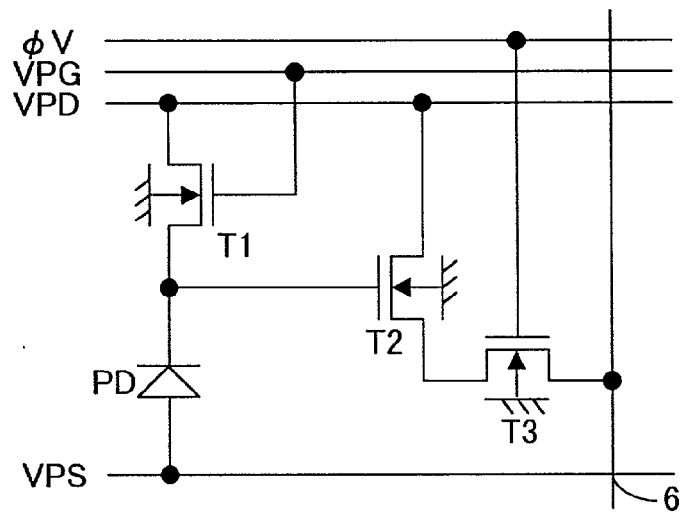
FIG. 5 is a circuit diagram showing the configuration of one pixel provided in the area sensor of FIG. 2.
Figure 6:
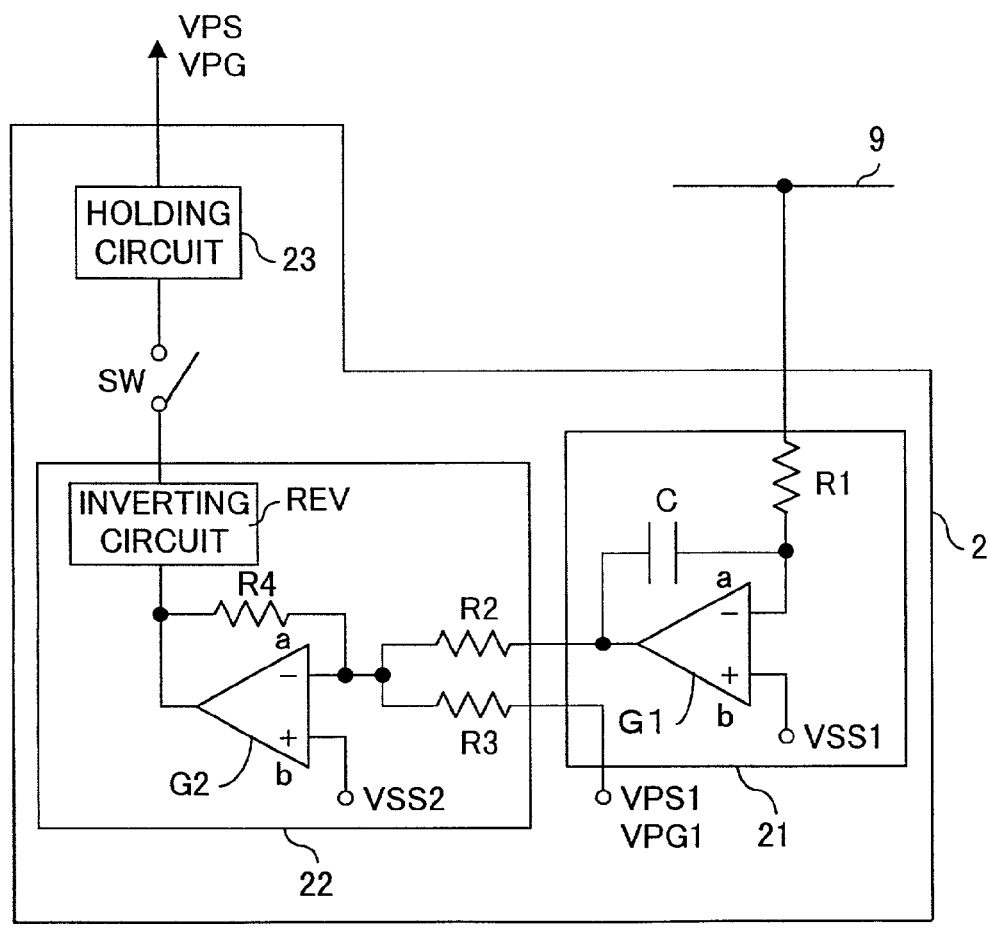
FIG. 6 is a block circuit diagram illustrating the overall configuration of the level adjustment circuit provided in the image-sensing device of FIG. 1.

Hereinafter, an embodiment of the present invention will be described with reference to the drawings. FIG. 1 is a block diagram showing the internal configuration of an image-sensing device embodying the invention. FIG. 2 is a circuit diagram illustrating an example of the configuration of the area sensor provided in the image-sensing device of FIG. 1. FIGS. 4 and 5 are circuit diagrams showing examples of the configuration of one pixel provided in the area sensor of FIG. 2. FIG. 6 is a circuit diagram illustrating an example of the configuration of the level adjustment circuit provided in the image-sensing device of FIG. 1. Here, level adjustment denotes optimizing the output signal of a LOG sensor by performing level conversion on the level used as a reference for a digital signal so that sharp images are obtained after analog-to-digital (A/D) conversion of the output signal. In this embodiment, level adjustment is achieved by adjusting the bias voltage fed to the individual pixels of the area sensor 1.

Overall Configuration

First, the overall configuration of the image-sensing device of this embodiment will be described with reference to FIG. 1. The image-sensing device shown in FIG. 1 has a plurality of pixels, each having a photosensitive element, arranged in a matrix. Moreover, the image-sensing device has an area sensor 1 that produces an electric signal that is logarithmically proportional to the brightness of the light incident thereon from outside, a level adjustment circuit 2 that varies the direct-current voltage VPS or VPG (described later) fed to the area sensor 1 according to the electric signal output from the area sensor 1, and an output terminal OUT by way of which the output signal of the area sensor 1 is fed out. The signal fed out via the output terminal OUT is converted, through AD conversion, into a digital signal, is then subjected to signal processing, and is then reproduced on a monitor or the like or recorded on a recording medium.

Internal Configuration of the Area Sensor

An example of the internal configuration of the area sensor 1 provided in the image-sensing device of this embodiment will be described with reference to FIG. 2. FIG. 2 schematically shows the configuration of a portion of the area sensor 1. In this figure, reference symbols G11 to Gmn represent pixels that are arranged in a two-dimensional array (in a matrix). Reference numeral 3 represents a vertical scanning circuit, which scans lines (rows) 5-1, 5-2, . . . , 5-n sequentially. Reference numeral 4 represents a horizontal scanning circuit, which reads out, sequentially pixel by pixel in a horizontal direction, the signals fed from the individual pixels to output signal lines 6-1, 6-2, . . . , 6-m as a result of photoelectric conversion performed in those pixels. Reference numeral 10 represents a power line. The individual pixels are connected not only to the lines 5-1, 5-2, . . . , 5-n, to the output signal lines 6-1, 6-2, . . . , 6-m, and to the power line 10 mentioned above, but also to other lines (for example clock lines and bias supply lines). These other lines, however, are omitted in FIG. 2, and are shown in FIG. 4 or 5.

As shown in FIG. 2, for each of the output signal lines 6-1, 6-2, . . . , 6-m, a pair of N-channel MOS transistors Q1 and Q2 is provided. The MOS transistor Q1 has its gate connected to a direct-current voltage line 7, has its drain connected to the output signal line 6-1, and has its source connected to a line 8 of a direct-current voltage VPSA. On the other hand, the MOS transistor Q2 has its drain connected to the output signal line 6-1, has its source connected to a signal line 9 serving as a final destination line, and has its gate connected to the horizontal scanning circuit 4.

Figure 3A:
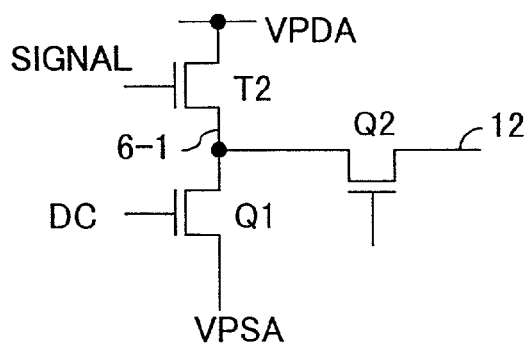
FIGS. 3A and 3B are circuit diagrams of a portion of FIG. 2.

As will be described later, the pixels G11 to Gmn are each provided with an N-channel MOS transistor T2 that outputs a signal in accordance with the photoelectric charge generated in each pixel. How this MOS transistor T2 is connected to the above-mentioned MOS transistor Q1 is shown in FIG. 3A. Here, the direct-current voltage VPSA connected to the source of the MOS transistor Q1 and the direct-current voltage VPDA connected to the drain of the MOS transistor T2 fulfill the relation VPDA>VPSA, where the direct-current voltage VPSA is equal to, for example, the ground-level voltage. In this circuit configuration, the signal from a pixel is fed to the gate of the upper-stage MOS transistor T2, and a direct-current voltage DC is kept applied to the gate of the lower-stage MOS transistor Q1. Thus, the lower-stage MOS transistor Q1 is equivalent to a resistor or constant-current source, and therefore the circuit shown in FIG. 3A forms an amplifier circuit of a source-follower type. Here, it can safely be assumed that, as a result of amplification, the MOS transistor T2 outputs a current.

Figure 3B:
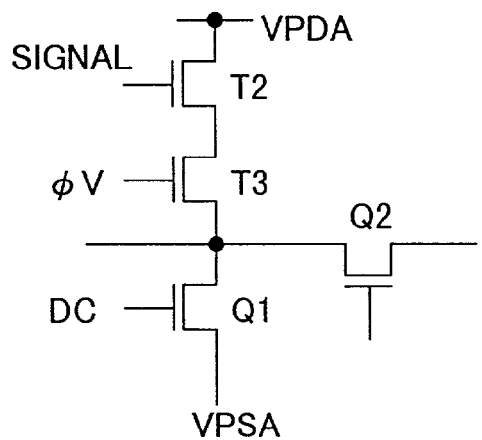

The MOS transistor Q2 is controlled by the horizontal scanning circuit 4 so as to function as a switching device. As will be described later, within each pixel shown in FIG. 4 or 5, another N-channel MOS transistor T3 functioning as a switch is provided. If this MOS transistor T3 is illustrated explicitly, the circuit shown in FIG. 3A has, more precisely, a circuit configuration as shown in FIG. 3B. Specifically, the MOS transistor T3 is inserted between the MOS transistor Q1 and the MOS transistor T2. Here, the MOS transistor T3 serves to select a row, and the MOS transistor Q2 serves to select a column.

The circuit configuration shown in FIGS. 3A and 3B permits the signal to be output with a high gain. Accordingly, even in a case where the photoelectric current generated in a photosensitive element is converted natural-logarithmically and thus the output signal obtained is comparatively low, this amplifier circuit amplifies the signal so as to make it sufficiently high and thus easier to process in the succeeding signal processing circuit (not shown). Here, the MOS transistor Q1 that serves as the load resistor of the amplifier circuit is provided within each pixel; however, such transistors may be provided, instead, one for each of the output signal lines 6-1, 6-2, . . . , 6-m, i.e. one for each of the groups of pixels that individually constitute columns, with the pixels constituting each column collectively connected to one of the output signal lines 6-1, 6-2, . . . , 6-m. This helps reduce the number of load resistors or constant-current sources required, and thus reduce the area occupied by the amplifying circuits on a semiconductor chip.

First Example of Pixel Configuration

An example of the configuration applicable to each pixel in the configuration shown in FIG. 2 will be described with reference to FIG. 4.

In FIG. 4, a pn photodiode PD constitutes a photosensitive portion (photoelectric conversion portion). The anode of this photodiode PD is connected to the drain and gate of a MOS transistor T1 and to the gate of a MOS transistor T2. The source of the MOS transistor T2 is connected to the drain of a line-selecting MOS transistor T3. The source of the MOS transistor T3 is connected to the output signal line 6 (this output signal line 6 corresponds to the output signal lines 6-1, 6-2, . . . , 6-m shown in FIG. 2).

A direct-current voltage VPD is applied to the cathode of the photodiode PD and to the drain of the MOS transistor T2. On the other hand, a direct-current voltage VPS is applied to the source of the MOS transistor T1. Moreover, a signal φV is fed to the gate of the MOS transistor T3. The MOS transistors T1 to T3 are all N-channel MOS transistors with their back gates grounded.

In this circuit, when the MOS transistor T1 is operating in a subthreshold region, the following equation holds:

$$Vg = VPS + Vt + (nkT/q) \cdot \ln(Ip/Id) \qquad (1)$$

where Vg represents the gate voltage of the MOS transistor T1, Vt represents the threshold voltage of the MOS transistor T1, n represents a constant determined by the gate insulating film capacitance and the depletion layer capacitance, k represents the Boltzmann constant, q represents the electric charge of an electron, Ip represents the photocurrent flowing out of the photodiode PD, and Id represents the drain current of the MOS transistor T1.

Thus, it will be clear from equation (1) that, in a pixel having a circuit configured as described above, the gate voltage Vg of the MOS transistor T1 is natural-logarithmically proportional to the photocurrent Ip flowing out of the photodiode PD. Accordingly, when light is incident on the photodiode PD, a photocurrent appears therein, and, due to the subthreshold characteristics of a MOS transistor, a voltage natural-logarithmically proportional to the photocurrent appears at the gates of the MOS transistors T1 and T2. This voltage causes a current natural-logarithmically proportional to the photocurrent to flow through the MOS transistor T2.

In this state, the pulse signal φV is fed to the gate of the MOS transistor T3 to turn this transistor T3 on, so that a current natural-logarithmically proportional to the photocurrent flows through the MOS transistors T2 and T3, as their drain current, and is delivered to the output signal line 6. The current thus delivered to the output signal line 6 is natural-logarithmically proportional to the integral of the photocurrent. Here, the drain voltage of the MOS transistor Q1, which is determined by the on-state resistances of the MOS transistors T2 and Q1 (FIG. 2) and the current flowing therethrough, appears as an output signal on the output signal line 6. After the output signal is read out in this way, the MOS transistor T3 is turned off.

Second Example of Pixel Configuration

Another example of the configuration applicable to each pixel in the configuration shown in FIG. 2 will be described with reference to FIG. 5.

In FIG. 5, a pn photodiode PD constitutes a photosensitive portion (photoelectric conversion portion). The cathode of this photodiode PD is connected to the source of a MOS transistor T1 and to the gate of a MOS transistor T2. The source of the MOS transistor T2 is connected to the drain of a line-selecting MOS transistor T3. The source of the MOS transistor T3 is connected to the output signal line 6 (this output signal line 6 corresponds to the output signal lines 6-1, 6-2, ..., 6-m shown in FIG. 2).

A direct-current voltage VPS is applied to the anode of the photodiode PD. On the other hand, a direct-current voltage VPD is applied to the drain of the MOS transistor T1 and to the drain of the MOS transistor T2. Moreover, a signal φV is fed to the gate of the MOS transistor T3, and a direct-current voltage VPG is applied to the gate of the MOS transistor T1. The MOS transistors T1 to T3 are all N-channel MOS transistors with their back gates grounded.

In this circuit, when the MOS transistor T1 is operating in a subthreshold region, the following equation holds:

$$Vs = VPG - Vt - (nkT/q) \cdot \ln(Ip/Id) \qquad (2)$$

where Vs represents the source voltage of the MOS transistor T1, Vt represents the threshold voltage of the MOS transistor T1, n represents a constant determined by the gate insulating film capacitance and the depletion layer capacitance, k represents the Boltzmann constant, q represents the electric charge of an electron, Ip represents the photocurrent flowing out of the photodiode PD, and Id represents the drain current of the MOS transistor T1.

Thus, it will be clear from equation (2) that, in a pixel having a circuit configured as described above, the source voltage Vs of the MOS transistor T1 is natural-logarithmically proportional to the photocurrent Ip flowing out of the photodiode PD. Accordingly, when light is incident on the photodiode PD, a photocurrent appears therein, and, due to the subthreshold characteristics of a MOS transistor, a voltage natural-logarithmically proportional to the photocurrent appears at the source of the MOS transistor T1 and the gate of the MOS transistor T2. Here, the photoelectric charge that appears in the photodiode PD and flows into the source of the MOS transistor T1 is negative, and therefore, the more intense the incident light, the lower the source voltage of the MOS transistor T1.

In this way, a voltage natural-logarithmically proportional to the photocurrent appears at the gate of the MOS transistor T2. In this state, the pulse signal φV is fed in to turn the MOS transistor T3 on, so that a current natural-logarithmically proportional to the photocurrent flows through the MOS transistors T2 and T3 and is delivered to the output signal line 6. The current thus delivered to the output signal line 6 is natural-logarithmically proportional to the integral of the photocurrent. Here, the drain voltage of the MOS transistor Q1, which is determined by the on-state resistances of the MOS transistors T2 and Q1 (FIG. 2) and the current flowing therethrough, appears as an output signal on the output signal line 6. After the output signal is read out in this way, the MOS transistor T3 is turned off.

Internal Configuration of the Level Adjustment Circuit

The internal configuration of the level adjustment circuit 2 provided in the image-sensing device shown in FIG. 1 will be described with reference to FIG. 6.

The level adjustment circuit 2 shown in FIG. 6 has an integrator-type amplifier 21. This integrator-type amplifier 21 is composed of a resistor R1 having one end thereof connected to the signal line 9 serving as the final destination line of the area sensor 1, an operational amplifier G1 having the inverting input terminal "a" thereof connected to the other end of the resistor R1 and receiving at the non-inverting input terminal "b" thereof a direct-current voltage VSS1, and a capacitor C connected between the output terminal and the inverting input terminal "a" of the operational amplifier G1.

The level adjustment circuit 2 further has an adder-type amplifier 22. This adder-type amplifier 22 is composed of a resistor R2 having one end thereof connected to the output terminal of the operational amplifier G1, a resistor R3 having one end thereof connected to the other end of the resistor R2 and receiving at the other end thereof a direct-current voltage VPS1 or VPG1, an operational amplifier G2 having the inverting input terminal "a" thereof connected to the node between the resistors R2 and R3 and receiving at the non-inverting input terminal "b" a direct-current voltage VSS2, a resistor R4 connected between the output terminal and the inverting input terminal "a" of the operational amplifier G2, and a inverting circuit REV connected to the node between the output terminal of the operational amplifier G2 and the resistor R4. As the inverting circuit is used, for example, an inverter.

Furthermore, the level adjusting circuit 2 has, in addition to the integrator-type and adder-type amplifiers 21 and 22, a switch SW having one contact thereof connected to the output side of the inverting circuit REV, and a holding circuit 23 connected to the other contact of the switch SW so as to temporarily hold the voltage signal fed thereto from the adder-type amplifier 22. This holding circuit 23 is connected to the area sensor 1 so that the voltage signal held in the holding circuit 23 is fed to the area sensor 1. The holding circuit 23 is built, for example, as a circuit composed of a capacitor having one end thereof connected to the other contact of the switch SW and receiving at the other end thereof a direct-current voltage.

The level adjustment circuit 2, having a circuit configured as described above, operates as follows. First, the voltage of the output signal of the area sensor 1 is integrated by the integrator-type amplifier 21. This integrator-type amplifier 21 yields an inverted output, and therefore, as the signal fed to the inverting input terminal "a" of the operational amplifier G1 provided within the integrator-type amplifier 21 increases or decreases, the output of the operational amplifier G1 decreases or increases, respectively.

Next, the voltage of the signal integrated by the integrator-type amplifier 21 is added to the direct-current voltage VPS1 or VPG1 by the adder-type amplifier 22. Here, the operational amplifier G2 outputs the voltage signal resulting from this addition as an inverted signal, but this voltage signal is eventually inverted again by the inverting circuit REV so as to be output as a voltage signal having the same polarity as the original signal. Here, when the switch SW is on, the output of the adder-type amplifier 22 is fed to the holding circuit 23 and thus to the area sensor 1. When the output of the adder-type amplifier 22 is fed to the holding circuit 23, the switch SW is turned off.

In the level adjustment circuit 2 operating as described above, by keeping the switch SW off while the area sensor 1 is outputting an output signal corresponding to one frame, and then turning the switch SW on as soon as the area sensor 1 completes outputting the output signal corresponding to that one frame, it is possible to change the state of the area sensor 1 so as to adjust the level of its output signal before it starts outputting the next frame.

The output signal fed from the area sensor 1 to the level adjustment circuit 2 does not necessarily have to be the output signal of all the pixels provided in the area sensor 1, but may be the output signal of a plurality of specific pixels or that of a specific single pixel. In cases where the area sensor 1 performs image sensing in an interlaced fashion, it is possible to feed the output signal of the pixels that are currently not performing image sensing to the level adjustment circuit 2. Instead of keeping the switch SW off while the area sensor 1 is outputting an output signal corresponding to one frame so that the output level of the area sensor 1 is adjusted for every frame, it is also possible to keep the switch SW off while the area sensor 1 is outputting an output signal corresponding to several frames so that the output level of the area sensor 1 is adjusted for every several frames.

Figure 7:
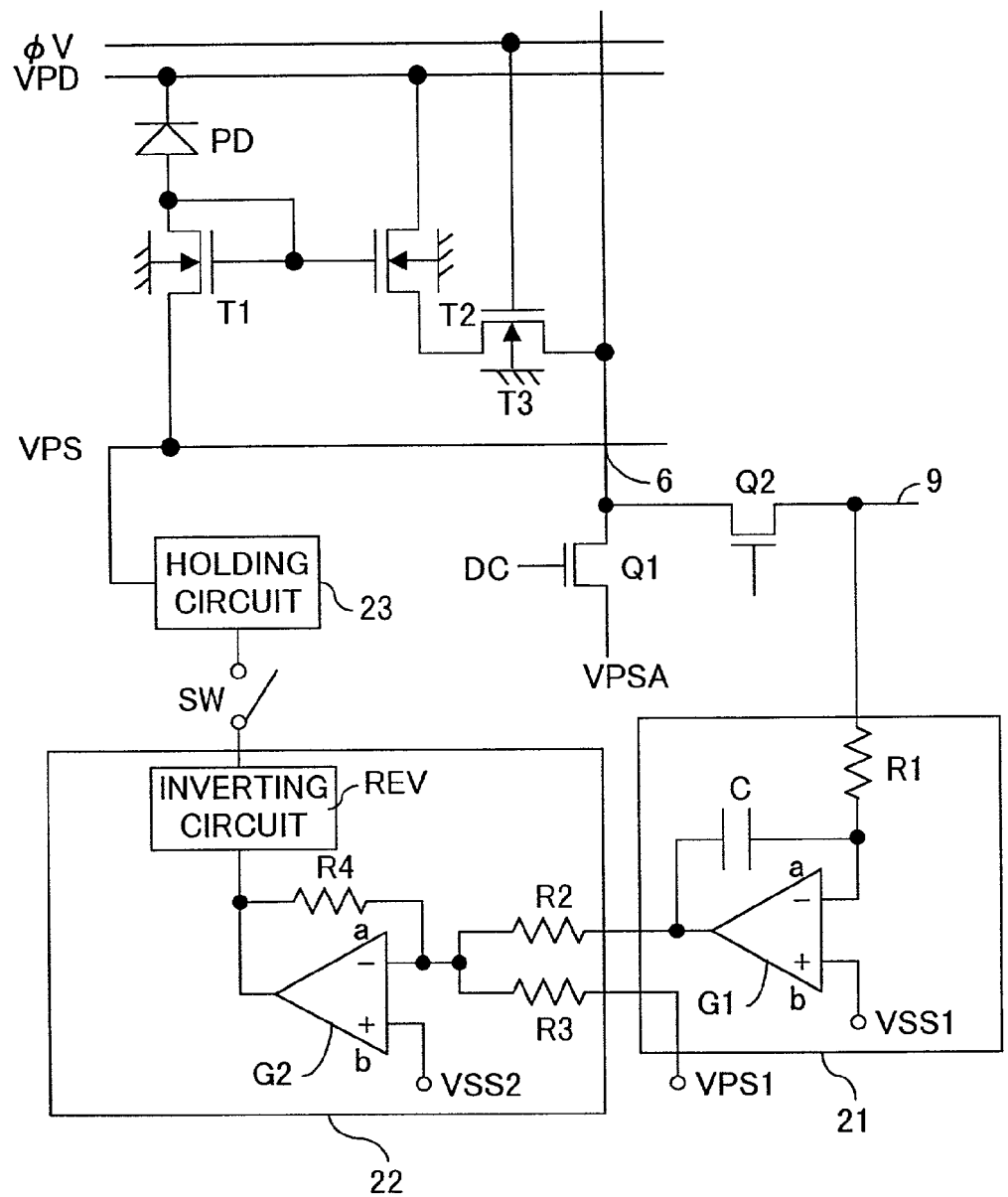
FIG. 7 is a block circuit diagram showing the relationship between the pixel of FIG. 4 and the level adjustment circuit.
Figure 8:
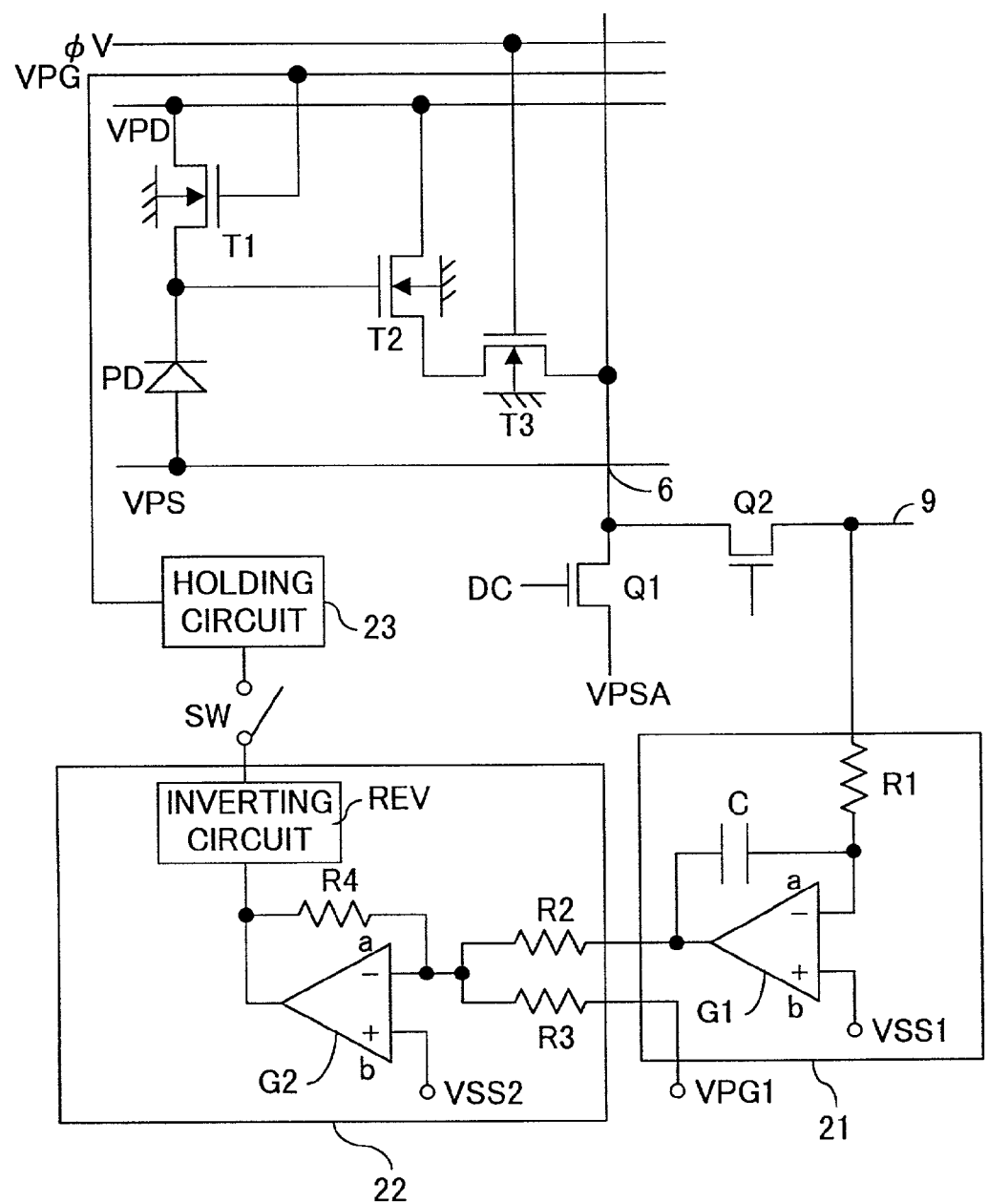
FIG. 8 is a block circuit diagram showing the relationship between the pixel of FIG. 5 and the level adjustment circuit.

Now, with reference to the drawings, a description will be given of two cases in which the previously described first and second examples of pixel configuration (FIGS. 4 and 5), respectively, are applied to the pixels provided in the area sensor 2 in an image-sensing device having a level adjustment circuit 2 operating as described above. FIGS. 7 and 8 are diagrams showing the relationship between the pixels and the level adjustment circuit 2, taking up as a representative only one among the pixels provided in the area sensor 1 for simplicity's sake.

1. When the First Example of Pixel Configuration is Applied

As shown in FIG. 7, in a pixel having a circuit configured as shown in FIG. 4, to the signal line to which the source of the MOS transistor T1 is connected to receive the direct-current voltage VPS, the holding circuit 23 provided in the level adjustment circuit 2 is connected. In this pixel, having a circuit configured as shown in FIG. 4, equation (1) noted previously holds.

Therefore, the more intense the incident light, and thus the higher the photocurrent flowing out of the photodiode PD, the higher the gate voltage of the MOS transistor T1. Accordingly, the gate voltage of the MOS transistor T2 becomes higher, which causes the drain current of the MOS transistor T2, and thus the output current delivered to the output signal line 6, to increase. As a result, the voltage of the output signal appearing on the signal line 9 serving as the final destination line becomes higher.

In this way, when the incident light is intense on the whole, the signal fed from the area sensor 1 to the integrator-type amplifier 21 becomes higher, and thus the output of the integrator-type amplifier 21 becomes lower. Accordingly, the voltage added to the direct-current voltage VPS1 by the adder-type amplifier 22 becomes lower, and thus the direct-current voltage VPS fed to the source of the MOS transistor T1 becomes lower. As will be clear from equation (1) noted previously, as the direct-current voltage VPS becomes lower, the gate voltage of the MOS transistor T1 becomes lower, making the output for the next frame lower.

By contrast, the dimmer the incident light, and thus the lower the photocurrent flowing out of the photodiode PD, the lower the gate voltage of the MOS transistor T1. Accordingly, the gate voltage of the MOS transistor T2 becomes lower, which causes the drain current of the MOS transistor T2, and thus the output current delivered to the output signal line 6, to decrease. As a result, the voltage of the output signal appearing on the signal line 9 serving as the final destination line becomes lower.

In this way, when the incident light is dim on the whole, the signal fed from the area sensor 1 to the integrator-type amplifier 21 becomes lower, and thus the output of the integrator-type amplifier 21 becomes higher. Accordingly, the voltage added to the direct-current voltage VPS1 by the adder-type amplifier 22 becomes higher, and thus the direct-current voltage VPS fed to the source of the MOS transistor T1 becomes higher. As will be clear from equation (1) noted previously, as the direct-current voltage VPS becomes higher, the gate voltage of the MOS transistor T1 becomes higher, making the output for the next frame higher.

2. When the Second Example of Pixel Configuration is Applied

As shown in FIG. 8, in a pixel having a circuit configured as shown in FIG. 5, to the signal line to which the gate of the MOS transistor T1 is connected to receive the direct-current voltage VPG, the holding circuit 23 provided in the level adjustment circuit 2 is connected. In this pixel, having a circuit configured as shown in FIG. 5, equation (2) noted previously holds.

Therefore, the more intense the incident light, and thus the higher the photocurrent flowing out of the photodiode PD, the lower the source voltage of the MOS transistor T1. Accordingly, the gate voltage of the MOS transistor T2 becomes lower, which causes the drain current of the MOS transistor T2, and thus the output current delivered to the output signal line 6, to decrease. As a result, the voltage of the output signal appearing on the signal line 9 serving as the final destination line becomes lower.

In this way, when the incident light is intense on the whole, the signal fed from the area sensor 1 to the integrator-type amplifier 21 becomes lower, and thus the output of the integrator-type amplifier 21 becomes higher. Accordingly, the voltage added to the direct-current voltage VPG1 by the adder-type amplifier 22 becomes higher, and thus the direct-current voltage VPG fed to the gate of the MOS transistor T1 becomes higher. As will be clear from equation (2) noted previously, as the direct-current voltage VPG becomes higher, the source voltage of the MOS transistor T1 becomes higher, making the output for the next frame higher.

By contrast, the dimmer the incident light, and thus the lower the photocurrent flowing out of the photodiode PD, the higher the source voltage of the MOS transistor T1. Accordingly, the gate voltage of the MOS transistor T2 becomes higher, which causes the drain current of the MOS transistor T2, and thus the output current delivered to the output signal line 6, to increase. As a result, the voltage of the output signal appearing on the signal line 9 serving as the final destination line becomes higher.

In this way, when the incident light is dim on the whole, the signal fed from the area sensor 1 to the integrator-type amplifier 21 becomes higher, and thus the output of the integrator-type amplifier 21 becomes lower. Accordingly, the voltage added to the direct-current voltage VPG1 by the adder-type amplifier 22 becomes lower, and thus the direct-current voltage VPG fed to the gate of the MOS transistor T1 becomes lower. As will be clear from equation (2) noted previously, as the direct-current voltage VPG becomes lower, the source voltage of the MOS transistor T1 becomes lower, making the output for the next frame lower.

In this way, in any embodiment of the present invention, automatic level adjustment of the output signal is realized with a simple circuit configuration. In the embodiment specifically described hereinbefore, level adjustment of the output of the area sensor is achieved by using the integral of the outputs of a plurality of pixels. However, it is also possible to achieve level adjustment of the output of the area sensor through feedback control using the outputs of a plurality of pixels as they are, i.e. without integrating them. Alternatively, instead of using the output of the area sensor, it is possible to provide a means for measuring the brightness of the subject and feed the measured brightness to the level adjustment circuit so that the level of the output signal of the area sensor is adjusted according to the brightness of the subject.

The circuit configuration of each pixel is not limited to those shown in FIGS. 4 and 5. For example, each pixel may be so configured as to include an integrator circuit following the MOS transistor T2, or include a resetting means for resetting the source or gate of the MOS transistor T1. The area sensor 1 may be composed of, instead of N-channel MOS transistors, P-channel MOS transistors.

In an image-sensing device according to the present invention, a level adjustment means achieves feedback control that permits the level of the output signal of individual pixels to be adjusted constantly. This makes it possible to adjust the level of the output signal of the individual pixels on a real-time basis according to the brightness of the light with which the subject is illuminated, and thus to shoot the subject within an optimal brightness range. As a result, it is possible to obtain sharper images.

What is claimed is:

1. An image-sensing device comprising:
    a plurality of pixels each comprising a photosensitive element that generates an electric signal proportional to an amount of incident light and a transistor that outputs an analog signal that is natural-logarithmically proportional to the amount of incident light; and
    a level adjuster that adjusts a level of the analog signal output from the pixels by adjusting, according to the analog signal output from the pixels, a bias voltage fed to the transistor, wherein:
        the photosensitive element receives at a second electrode thereof a direct-current voltage;
        the transistor has a first electrode, a second electrode, and a control electrode, the transistor having the second electrode thereof connected to a first electrode of the photosensitive element so that electric charge output from the photosensitive element flows into the transistor, the transistor receiving at the first and control electrodes thereof direct-current voltages individually so that the transistor operates in a subthreshold region; and
        the level adjuster adjusts the level of the analog signal output from the pixels by adjusting the direct-current voltage applied to the control electrode of the transistor.

2. An image-sensing device as claimed in claim 1, wherein the pixels are arranged in a matrix so as to form an area sensor as a whole.

3. An image-sensing device as claimed in claim 1, wherein the level adjuster produces the direct-current voltage applied to the control electrode of the transistor by subtracting from a predetermined voltage a voltage according to the electric signal output from a plurality of pixels.

4. An image-sensing device as claimed in claim 3, wherein the pixels are arranged in a matrix so as to form an area sensor as a whole.

5. An image-sensing device as claimed in claim 3, wherein the level adjuster comprises:
    an integrator circuit for integrating the voltage according to the electric signal output from the plurality of pixels; and
    a subtracting circuit for subtracting from the predetermined voltage the voltage integrated by the integrator circuit,
    wherein a voltage output from the subtracting circuit is fed to the control electrode of the transistor.

6. An image-sensing device as claimed in claim 5, wherein the level adjuster further comprises:
    a holding circuit for holding the voltage output from the subtracting circuit; and
    a switch connected between the subtracting circuit and the holding circuit.

7. An image-sensing device as claimed in claim 6, wherein the pixels are arranged in a matrix so as to form an area sensor as a whole.

8. An image-sensing device comprising:
    an area sensor part including a plurality of pixels arranged in a matrix, each pixel comprising a photosensitive element that generates an electric signal proportional to an amount of incident light and a transistor that outputs an analog signal that is natural-logarithmically proportional to the amount of incident light; and
    a level adjuster that adjusts a level of the analog signal output from the area sensor part by adjusting a bias voltage applied to the transistor so as to make the signal output higher as a whole when the incident light is intense and so as to make the signal output lower as a whole when the incident light is dim.

9. An image-sensing device as claimed in claim 8, wherein the level adjuster adjusts the level of the analog signal output from the area sensor part by using the output of the pixels.

10. An image-sensing device as claimed in claim 8, wherein the level adjuster adjusts the level of the analog signal output from the area sensor part by using an integral of the output of the pixels.

11. An image-sensing device as claimed in claim 8, wherein the level adjuster adjusts the level of the analog signal output from the area sensor part according to a brightness of a subject measured by means for measuring brightness.

12. An image-sensing device as claimed in claim 8, wherein the level adjuster holds an adjustment signal relatively constant while the area sensor is outputting an output signal corresponding to one frame.

13. An image-sensing device as claimed in claim 8, wherein the level adjuster adjusts the level of the analog signal output from the area sensor part for every frame.

14. An image-sensing device as claimed in claim 8, wherein the level adjuster adjusts the level of the analog signal output from the area sensor part once for a plurality of frames.

15. An image-sensing device as claimed in claim 8, wherein the bias voltage is applied to a control electrode of the transistor.

* * * * *